United States Patent [19]

Simelunas et al.

[11] Patent Number: 4,851,248

[45] Date of Patent: Jul. 25, 1989

[54] PROCESS OF MAKING A CONFECTIONERY PRODUCT

[75] Inventors: William J. Simelunas, Glen Rock; Agostino Aquino, Paterson; Nicholas Polifroni, Cliffside Park, all of N.J.

[73] Assignee: Nabisco Brands, Inc., Parsippany, N.J.

[21] Appl. No.: 111,495

[22] Filed: Oct. 16, 1987

Related U.S. Application Data

[62] Division of Ser. No. 623,823, Jul. 20, 1984, Pat. No. 4,533,702.

[51] Int. Cl.[4] .......................... A23G 3/06; A23G 3/28
[52] U.S. Cl. .................................. 426/291; 426/293; 426/285; 426/307; 426/516
[58] Field of Search ............... 426/293, 291, 285, 307, 426/303, 305, 516, 517

[56] References Cited

U.S. PATENT DOCUMENTS

| | | | |
|---|---|---|---|
| 1,608,302 | 11/1926 | Cloud | 426/291 |
| 2,002,018 | 5/1935 | Martoccio | 426/293 |
| 2,032,962 | 3/1936 | Vogt | 107/1 |
| 2,054,319 | 9/1936 | Hanson | 209/111 |
| 2,080,113 | 5/1937 | Cloud | 426/293 |
| 2,152,758 | 4/1930 | Cox | 209/111 |
| 2,547,516 | 4/1951 | Zeun | 107/7 |
| 2,566,712 | 9/1951 | Zeun | 107/7 |
| 2,837,042 | 6/1958 | Laval, Jr. | 107/1 |
| 2,868,141 | 1/1959 | Griner | 107/1 |
| 2,967,493 | 1/1961 | Cloud et al. | 426/295 |
| 3,132,847 | 5/1964 | Mercuriali | 259/9 |
| 3,156,201 | 11/1964 | Tweedale | 221/211 |
| 3,245,360 | 4/1966 | Evanson et al. | 107/1 |
| 4,212,609 | 7/1980 | Fay | 425/100 |
| 4,239,126 | 12/1980 | Dobson et al. | 221/211 |
| 4,643,905 | 2/1987 | Getman | 426/565 |

FOREIGN PATENT DOCUMENTS

| | | |
|---|---|---|
| 52-11562 | 1/1977 | Japan . |
| 59-198929 | 4/1983 | Japan . |
| 117155 | 1/1927 | Switzerland . |
| 689612 | 4/1953 | United Kingdom . |

*Primary Examiner*—Donald E. Czaja
*Assistant Examiner*—Helen Pratt
*Attorney, Agent, or Firm*—Richard Kornutik

[57] ABSTRACT

A continuous confectionery product having discrete articles, such as peanuts or raisins, applied to the outer surface is made by passing a continuous confectionery rope through a rotating drum applicator. The applicator includes a hollow rotating drum having a circumferential groove adapted to cooperate with the continuously moving confectionery rope. A plurality of air passages are provided in the groove and a vacuum is applied to the inner surface of the drum whereby the drum picks up peanuts or raisins as they pass by a hopper. A positive pressure is applied to the holes in the drum as the peanuts or raisin come into contact with the confectionery rope to release the peanut or raisin and allow it to adhere to the confectionery rope. The rope then passes to a cutting station where it is cut into uniform lengths and coated with a suitable confectionery coating.

31 Claims, 11 Drawing Sheets

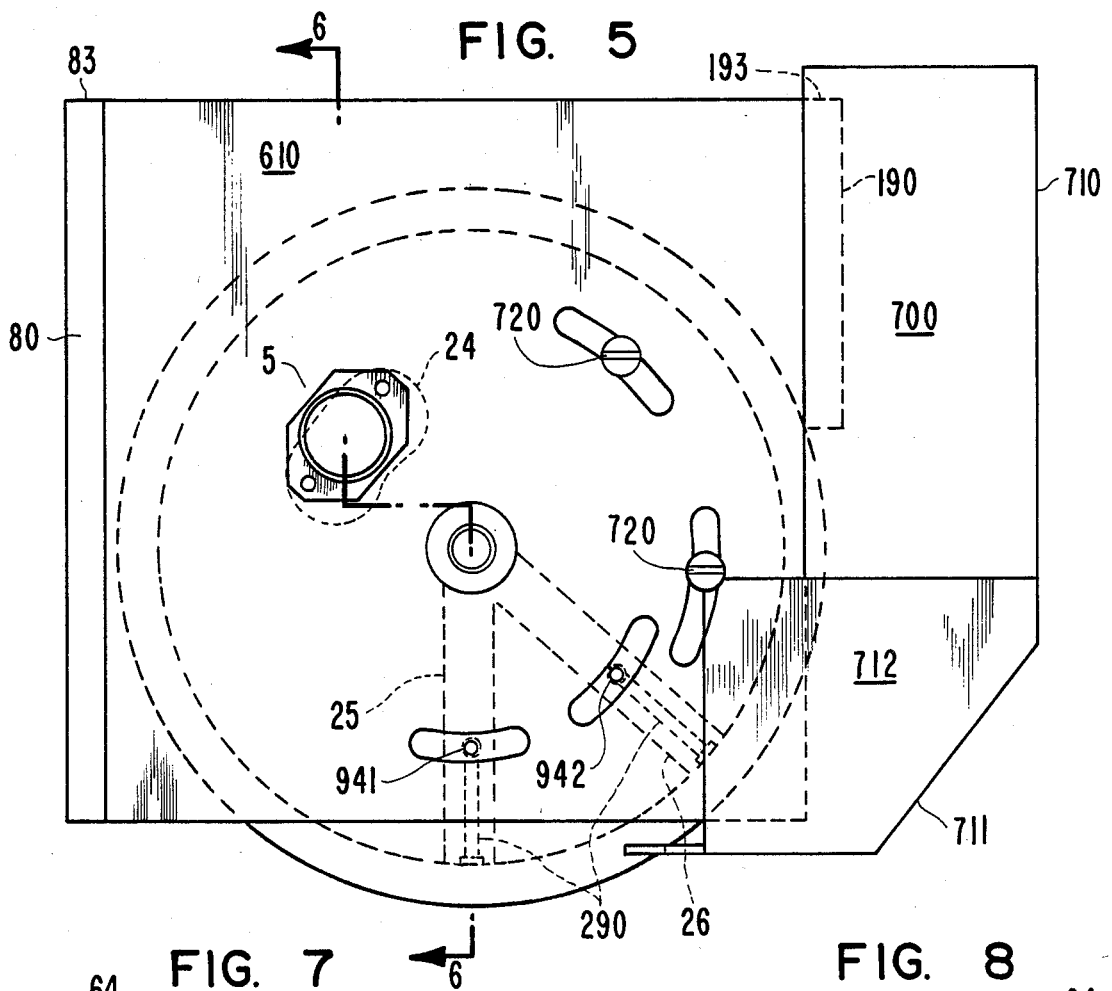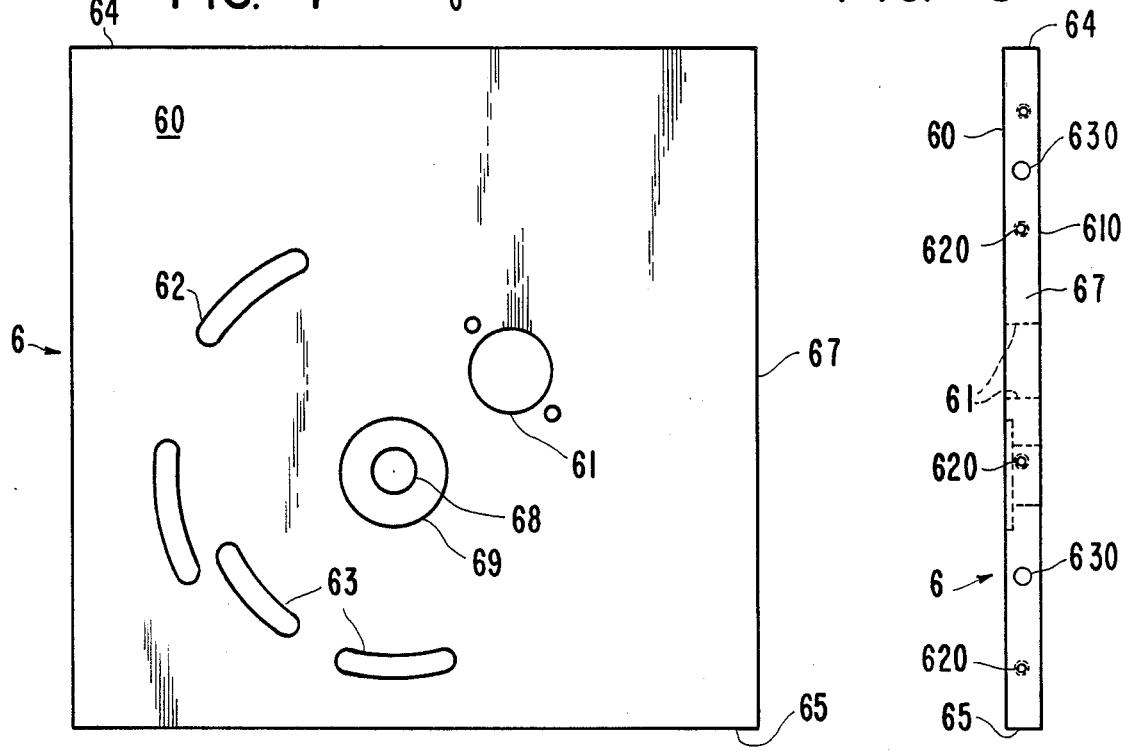

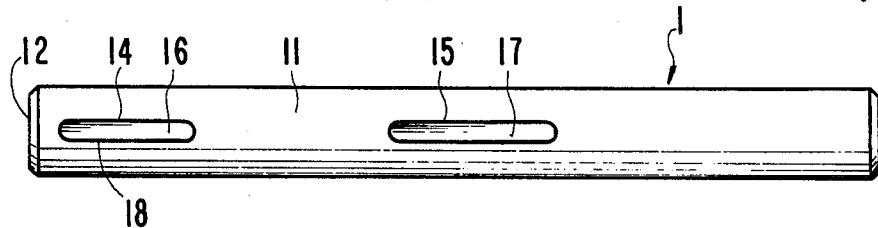
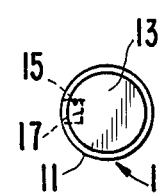
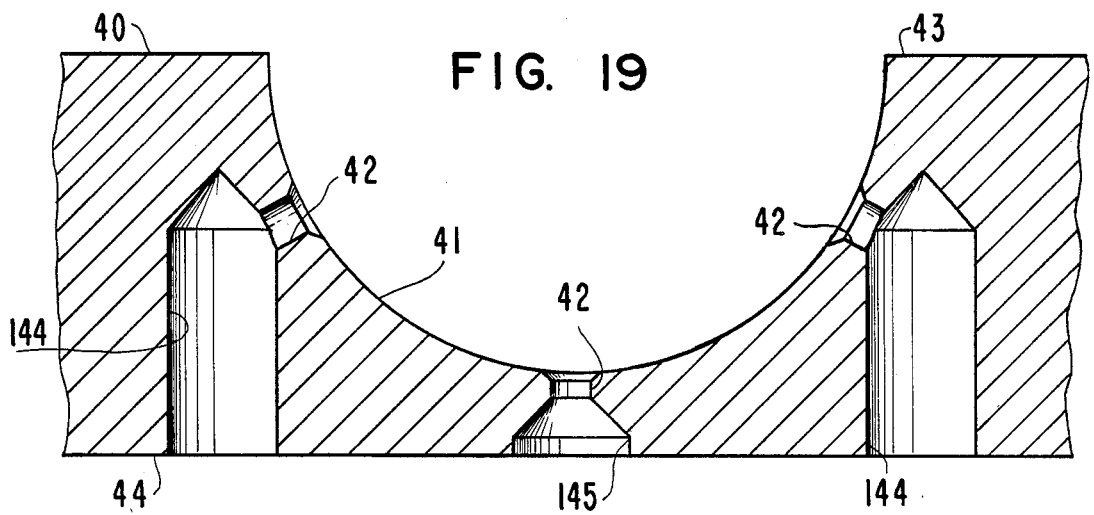
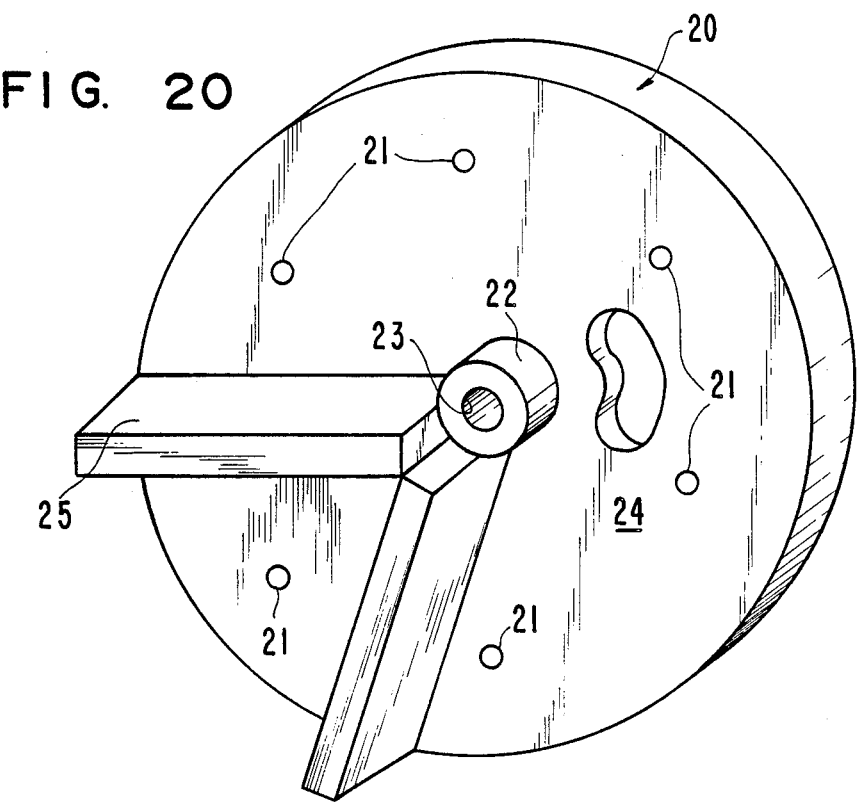

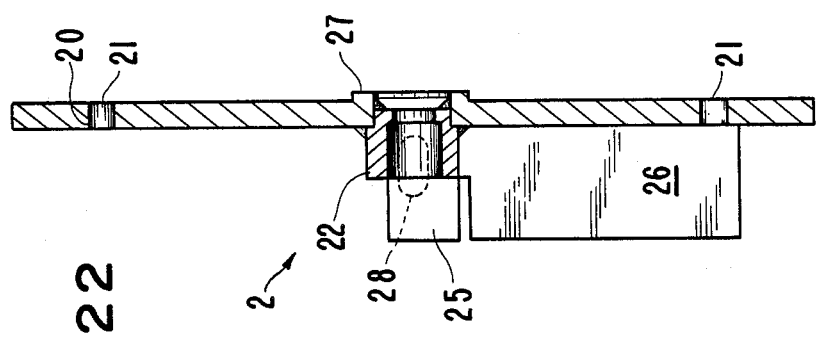
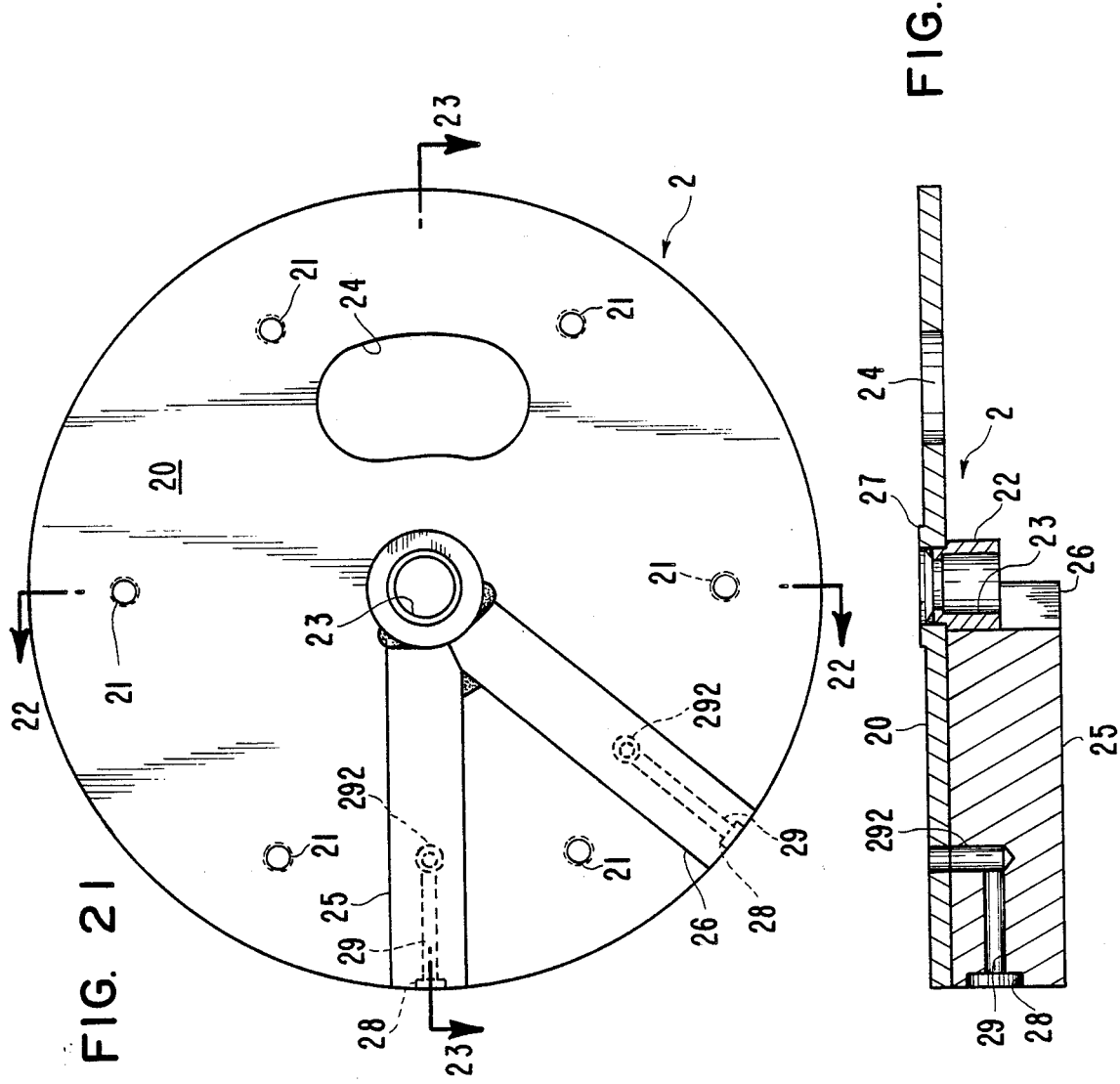
FIG. 22
FIG. 23
FIG. 21

PROCESS OF MAKING A CONFECTIONERY PRODUCT

This application is a division of prior U.S. Pat. application Ser. No. 632,823, filed July 20, 1984.

BACKGROUND OF THE INVENTION

Many attempts have been made in the prior art to apply discrete articles, such as peanuts, raisins, or the like, to an outer surface of a moving, continuous, rope of a comestible material. The rope may be an extrudate rope, or it may be formed by rolling or other forming operations.

In the prior art, making of a confectionery product is accomplished as follows.

Where an extrudate rope is to be processed by application thereto, the extrudate rope 100 can be formed by extrusion through an opening while the rope is not. The extrudate, shortly after being extruded, being relatively thick and hot, must be cooled so that it does not either fall apart or flatten during further processing. While following a cooling path the extrudate rope 100 can be stretched.

The extrudate rope at this early stage is slightly non-uniform, and is preferrably cooled along a relatively long path during which it is preferrably stretched at a pair of rollers so as to be suspended and so as to be formed by stretching into a relatively uniform size. While suspended the extrudate rope, which is preferrably composed of fudge at this point, can be surrounded by caramel at a nozzle inlet and can thereby be is coated by the caramel which adheres to the fudge.

At this point, the extrudate rope passes through a trough containing peanuts so that peanuts surround the extrudate rope 100. The caramel, being sticky, causes some of the peanuts to adhere to the extrudate rope 100. The extrudate rope, at this point, is relatively cool and resists stretching, so that further operations can be made upon the extrudate rope 100.

The extrudate rope is then cut by a guillotine cutter into bars having a relatively uniform length. The bars are then inspected to see that a relatively uniform coating of peanuts is maintained upon each bar. Due to the uneven distribution of peanuts upon some of the bars, those bars must be rejected. During this process, approximately 30% of the bars must be rejected for uneven peanut distribution. This is a significant problem which is addressed by the present invention.

Although a single extrudate rope has been discussed, ordinarily multiple rows of extrudate ropes are processed simultaneously. In one apparatus, for example, 16 rows across are used. The extrudate rope of fudge which is initially formed, is formed into a relatively square sided bar. After coating with caramel and peanuts, the bar assumes a somewhat more rounded shape.

Due to U.S. Government labeling requirements, as well as due to the requirements that the end product fit properly into standardized packages, it is an important problem in the art to form more uniform products including a relatively uniform bar shape and size and a more uniform coating of peanuts that is well-predictable. Thus, in keeping with the weight specified on the package labels, a highly uniform product can be made so as to very slightly exceed or equal the package labeling requirements. Also, as to ingredients, a highly uniform product results in less rejection loss where rejection loss occurs due to failure to meet the package labeling specification of ingredients and weight. The present invention addresses these problems.

If automated packaging techniques and machinery are to be used in connection with the end products of the present invention, i.e. candy bars, uniform peanut deposition is crucial. Also, during the operations to arrange the bars for packaging, the bars will rub together and unless the peanuts are uniformly well-embedded in the bar substate, peanuts may fall off.

Following deposition of the peanuts, a chocolate coating is dripped on the product. After cooling, this chocolate-coated bar forms the end product. This end product is referred to hereinafter as candy bars.

Several attempts have been made in the prior art to attack the above-identified problems. Fogt in U.S. Pat. No. 2,032,962, teaches a fruit and nut feeding mechanism; Evanson et al, in U.S. Pat. No. 3,245,360, teaches an apparatus for forming a confectionery product; Zeun, in U.S. Pat. No. 2,566,712, teaches a machine for depositing nuts on candy bars; and Zeun in U.S. Pat. No. 2,547,516, teaches another type of machine for depositing nuts on candy bars.

In Evanson, an apparatus for forming a confectionery product is shown, the confectionery product having nougat, caramel, and nuts as seen in FIG. 23 (for a round product) and in FIG. 24 (for a square cross sectional product). A nut dispenser assembly is shown in FIGS. 1, 3, and 4. A dispenser housing 48 has an impeller 52 with impeller blades 53 mounted on a drum 54 thereof. The impeller is keyed to one end of an impeller shaft 59. The final product has a nougat center that is coated with caramel and a layer of salted nuts which are at least partially embedded in the caramel. The impeller 52, through its rotation deposits a layer of salted peanuts on the belt 43. The sidewalls of the dispenser serves to retain nuts on the belt. A vibrator 13 spreads the nuts in an even layer as shown in FIG. 17. The belt travels under a caramel dispenser nozzle 202. If the caramel is too hot, it will melt the nougat; if too cold, it will not properly adhere to the peanuts.

The fruit and nut feeding mechanism of Fogt introduces pieces of edible solids such as fruits or nuts into a flowing stream of plastic comestible material such as semi-frozen ice cream, water ice, or sherbet. Fogt attempts to avoid crushing of the solid edible pieces such as fruits or nuts during dispensing thereof. A plurality of pockets are movable into position to receive the solid articles by gravity directly from an outlet of a hopper. Also, a mechanism is used to stir a mass of solid pieces in a hopper to maintain a fow of pieces. Each pocket is periodically moved into and out of communication with the confined path of travel of the plastic stream and the contents of each pocket are forcably injected into the flowing stream. The mouth of the pockets are sealed as they pass from charging to discharging position, and from discharging to charging position. Lifting fingers are provided near the hopper outlet. These are operated by operating rods which lie close to the inclined wall of the hopper. The fingers stir up the mass of articles only near the discharge end of the hopper where jamming is most likely to take place.

A machine for depositing nuts on candy bars, shown in Zeun U.S. Pat. No. 2,566,712 employs a plurality of rods 79 which are actuated to press peanuts into an underlying substrate, which substrate is edible. A rotary carrier employs a vacuum communicating with pockets 50, which pockets suck peanuts into pockets 50 and pockets pass beneath a peanut hopper full of peanuts. As the pockets pass from the hopper to a discharge position above the edible candy bars, the nuts are retained in the pockets by suction and also by a shield 84. When the pockets reach the discharge position above the candy bars 51, cams force tubes 75 outwardly, causing pins 78 and 79 to close ports 62 and 63 and cut off the vacuum from the pockets 50 and 50a. Further, the outward movement of the pins 78, 79, by engagement with the peanuts in the pockets, positively ejects the nuts from the pockets and pushes them into the upper surface of the candy bars.

Another type of machine for depositing nuts on candy bars is seen in Zeun U.S. Pat. No. 2,547,516. Here, a device is shown which is similar to that described in the above relating to the Zeun U.S. Pat. No. 2,566,712 reference. Here, a rotary agitator 60 has a plurality of wiper blades 63 formed of flexible material. This causes nuts which not entered openings 30 in the plate to be pushed into the openings and also to move the nuts away from an in turned branch 65. An arctuate shield 71 retains the nuts in the openings 30 as the drum rotates the peanuts to a point directly overlying a candy bar. The shield terminates at a point at which it is desired that the peanuts fall onto the candy bar. Furthermore, pins 110 act to push each peanut into the candy bars as the peanuts are deposited. Here, no vacuum need be used.

SUMMARY OF THE INVENTION

It is accordingly one object of the present invention to provide an improved peanut applicator for dispensing peanuts onto an edible substrate.

Another object of the invention is to provide an improved apparatus for co-extruding nugget and caramel under conditions of controlled temperature.

A further object of the present invention is to provide an improved applicator for edible articles which includes a source of vacuum, a source of pressurized air, and a rotating drum for applying articles.

A still further object of the present invention is to provide a means for guiding a continuous extrudate rope so that it remains directly beneath an applicator.

Another further object of the present invention is to provide an improved system for forming a confectionery product including a means for co-extruding nugget and caramel, a means for controlling the temperature of each of the extrudates, a means for conveying an extrudate rope formed by the co-extruded product, a means for applying edible articles to the extrudate rope.

The improved apparatus of the present invention comprises a rotary peanut applicator for applying peanuts to the top and sides of a traveling extrudate rope formed of nugget and caramel comestible material. A rotary drum is used to transfer peanuts from a peanut hopper to the extrudate rope. The drum has a plurality of small holes therein, which when coupled with a vacuum applied to the interior of the drum, causes peanuts to individually adhere to each individual hole.

At a point at which deposition of peanuts upon the extrudate rope is to occur, a source of pressurized air is applied to the holes directly overlying the extrudate rope. This causes separation of the peanut from the drum. A zone of pressurized air is created for approximately 30 degrees of arch travel of the drum, so as to cause any peanuts not deposited upon the extrudate rope to fall off the drum where they can be collected and returned to the top of a peanut hopper which supplies the drum with peanuts.

The improved apparatus of the present invention is usable in an improved system of the present invention, which includes a novel co-extruder for co-extruding the nugget and caramel which comprise the extrudate rope. Further, the temperature of the nugget and of the caramel is carefully controlled at the extruder so as to avoid melting of nugget while at the same time maintaining sufficient stickiness and softness of the caramel as to cause sticking of peanuts to the caramel.

Also, a guide means is usable in the system described above to facilitate proper positioning of the extrudate rope beneath a groove formed in the rotating drum, the groove being the area upon the drum which carries the peanuts. Also, a drive for the rotating drum includes a motor and transmission assembly. A source of vacuum, connected to the drum by a vacuum hose, is included also. Two pressurized supply lines supply two upstanding walls which have a cavity formed therein for conducting and communicating the air supply through the bottom of each of the walls which is closely adjacent the rotating drum. The walls themselves are stationary and are fixed to a stationary plate.

A conveyor belt conveys extrudate rope from the co-extruder to the peanut applicating drum. The conveyor belt may preferably continue on to a location where chocolate syrup is applied to the extrudate rope so that it overlies the peanuts and the caramel layers. The conveying means preferably continues onward to a location where the extrudate rope is cut into single bars. This may be done by a guillotine cutter, by a moving knife, by a hot wire, or by any other cutting means.

The individual bars are then conveyed to packaging equipment, where they are individually wrapped and sealed. The individually wrapped candy bars are then packaged into cartons or boxes. Cartons or boxes are then transferred to distributors and retailers.

By this means of production, and due to the carefully controlled temperatures at the co-extruder and the precise application of peanuts to the extrudate rope, the resulting candy bars so produced are of a highly uniform, shape, weight, and position, as compared to other methods of forming the product as shown in the prior art. This is advantageous in that the wrappers, having a pre-labeled weight and ingredient list, and having a predetermined size, thus correctly state the minimum net weight and the ingredient list. This minimizes excess weight required to assure that all of the candy bars exceed or meet the stated weight. Furthermore, the wrappers having a predetermined size, packaging of the candy bars is enhanced and may be made automatic, using automated machinery, because highly uniform candy bars can be readily packaged in this manner. In the prior art, up to 30% of all candy bars produced according to prior art methods were removed before packaging because they did not meet the minimum weight, shape, appearance, and other requirements of the finished product. Where the bars were not of sufficiently regular shape or uniformity, packaging by automatic machinery is not possible because an improperly sized candy bar, or one of sufficiently irregular shape (for example, due to misapplication of peanuts), tends to jam automatic machinery which results in costly delays.

The peanut applicator of the present invention may advantageously be employed in conjunction with the apparatus which produces a rope having the same general shape, composition, and size as the rope produced by the co-extruder. In this type of apparatus, only the nugget center is extruded, a lengthy conveying system being employed to allow the nugget to cool.

With this type of prior art device, the nugget, having sufficiently cooled, is conveyed in such manner as to be suspended at one point, which suspension can be made to accomplish two purposes. First, the extrudate rope is thereby stretched so as to be of a final desired diameter; and second while suspended it can be emersed or coated on all sides by a caramel coating.

The caramel coating must be maintained at a sufficiently high temperature that it, at a later stage of processing, retains sufficient heat and is sufficiently sticky as to retain the peanuts applied to it at that later stage without the peanuts falling off. For this to ocur, the caramel must be sufficiently soft that the peanuts applied will sink into the caramel somewhat. However, the caramel coating must be sufficiently cool that melting of the nugget layer does not occur. Any softening or melting of the nugget layer beyond the desired nugget temperature will result in deformation of the nugget and its surrounding caramel coating. This would tend to flaten the resulting candy bar, making it unsuitable for packaging.

In present systems, peanuts may be applied as taught by the prior art patents discussed in the above, or by suspending the caramel-covered nugget and pulling the rope through a supply of peanuts. This relies upon chance and upon the stickiness of the caramel to afix a sufficient number of peanuts, in an appropriate distribution to provide an acceptable candy bar. Due to this random variation in product quality, up to 30% of the resulting candy bars may be rejected. Furthermore, the prior art teachings of applying patents are either too expensive, too cumbersome, or are too prone to failure or jamming, as compared with the apparatus of the present invention.

The co-extruder, which in and of itself is already known in the prior art may additionally have temperature gauges or meters as well as heating or cooling means as desired. Further, in the present invention it is contemplated that a thermostat or other temperature controlling device may be employed in conjunction with the temperature meter and with the heating or cooling means to separately maintain both the nugget and the caramel at predetermined temperature levels. Thus, the temperature of the extrudate rope leaving the co-extruder nozzle is of a highly uniform temperature and therefore spreading, stretching, and other changes in the rope are no longer unpredictable, but would rather lead to production of a highly uniform product having predetermined characteristics.

It is also contemplated that the peanut applicator of the present invention be used in conjunction with a tamping device for tamping the peanuts deeper into the caramel layer. This tamping device, which may be a set of rollers, or moving arms, or which may be done manually if necessary, causes the peanuts adhering to the caramel to be more deeply embedded in the caramel layer. This results in fewer peanuts being lost during further processing, and also results in a more highly regular shape which enhances the packability of the resulting candy bars.

Further details and advantages of the present invention appear from the following description from a preferred embodiment shown schematically in the drawings.

BRIEF DESCRIPTION OF THE DRAWINGS

FIG. 3 is a side, sectional view of the extrudate rope and conveyor belt;

FIG. 5 is a side elevational view of the peanut applicator showing various parts in dotted outline;

FIG. 7 is a front elevational view of an air supply end plate according to the present invention;

FIG. 8 is a side elevational view of the end plate of FIG. 7;

FIG. 17 is a front elevational view of a shaft nut applicator rod;

FIG. 18 is a side elevational view of the applicator rod in FIG. 17;

FIG. 19 is a side sectional view of a portion of the drum member of FIGS. 15 and 16;

FIG. 20 is a perspective view of the rear side of a stationary drum end member;

FIG. 21 is a front elevational view of the end member of FIG. 20;

FIG. 22 is a side sectional view taken along line 22—22 of FIG. 21;

FIG. 23 is a side sectional view of the end member of FIG. 21 taken along line 23—23;

DETAILED DESCRIPTION OF THE INVENTION

Figure 1:
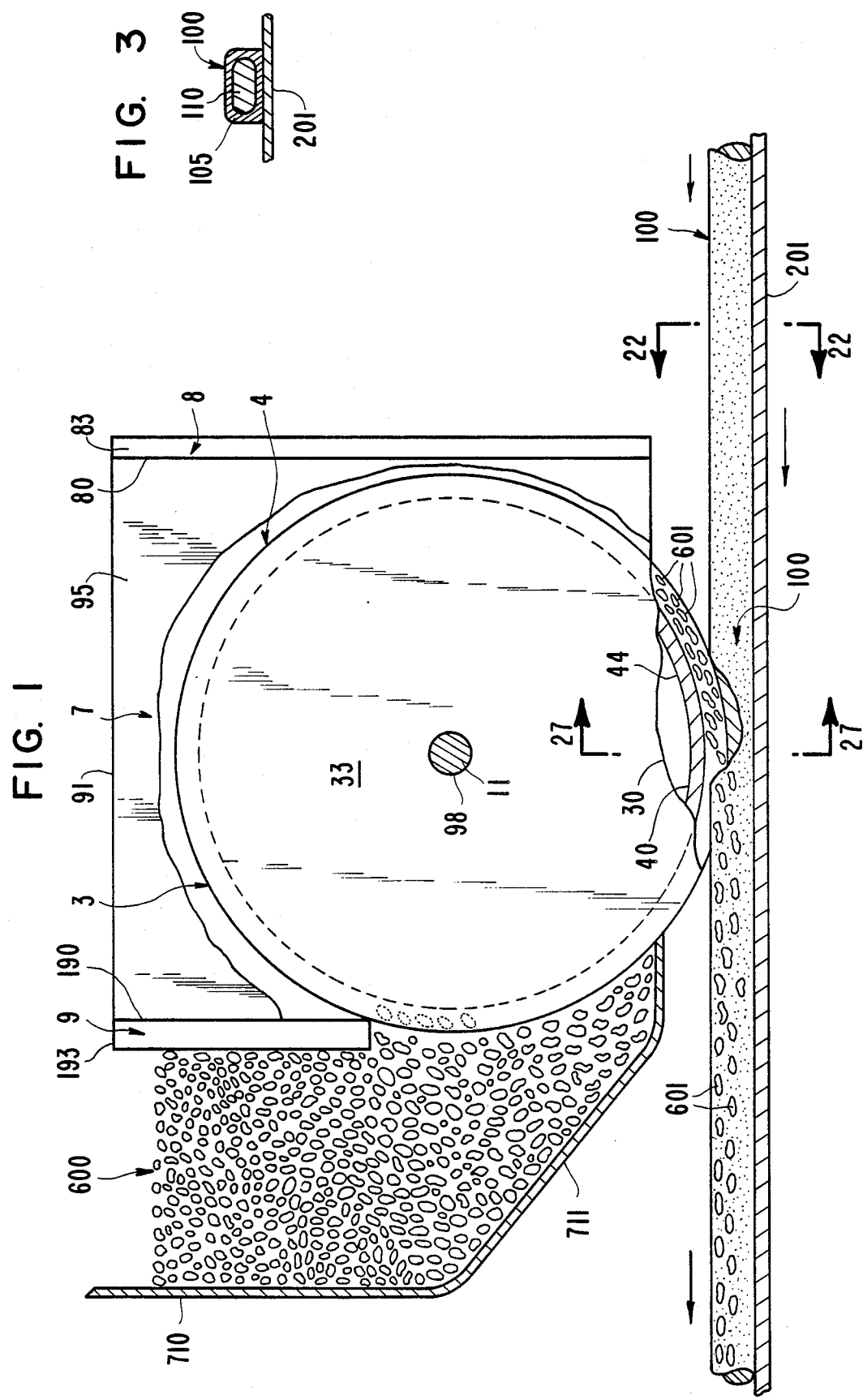
FIG. 1 is a side view, partially in section of the peanut applicator of the present invention in operation.

A partially broken away elevational view of a peanut applicator in operation according to the present invention, is shown in FIG. 1. An extrudate rope 100 moves from right to left as indicated by the arrows, in FIG. 1. The extrudate rope 100 is supported by a moving conveyor belt 201. The extrudate rope 100 passes beneath a rotating drum end member 3 which applies individual peanuts 601 to the top of the extrudate rope 100.

A peanut hopper having a hopper back wall 710 and a slanted hopper rear wall 711 holds a peanut supply 600. The rotating drum end member 3 picks up peanuts from the peanut hopper and rotates them to a position at which they are applied to the top and sides of the extrudate rope 100. As seen in FIG. 1, a flat end member outer wall 33 rotates with a cylindrical drum member 4 (which picks up peanuts as discussed hereunder). A cylindrical shaft body 11 is seen supporting the rotating drum end member 3 and the cylindrical drum member 4 for rotation. A shaft bore 98 in the rotating drum end member 3 receives the cylindrical shaft body 11. The rotating drum end member 3 and the cylindrical drum member 4 are in an enclosure formed by, as seen in FIG. 1, a top front wall plate edge 83, a top rear wall plate edge 193, and an end plate rear side 95. A top plate edge 91 of an end plate 17 is shown in the figure.

As the extrudate rope 100 passes beneath the cylindrical drum member 4, individual peanuts 601 are applied to extrudate rope 100. The extrudate rope 100 is shown in FIG. 3 as being of a generally rectangular cross section, having a caramel coating 105 and a nougat center 110. The extrudate rope 100 may be formed by any process, for example by co-extrusion of the caramel coating 105 and the nougat center 110, or in the alternative the nougat center 110 may be formed first by extrusion or by other means, and the caramel coating 105 applied later.

Figure 2:
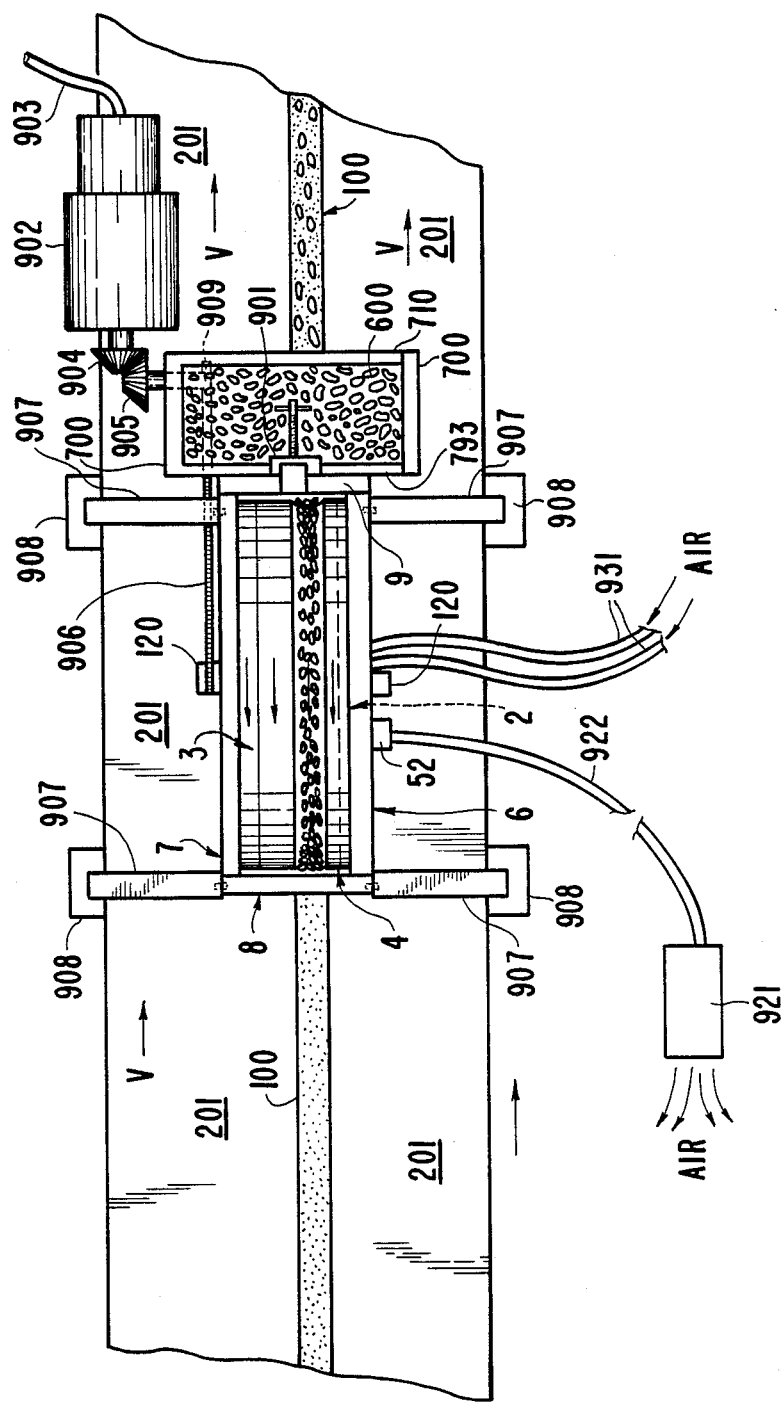
FIG. 2 is a top elevational view of the peanut applicator of the present invention in operation.

FIG. 2 is a top elevational view of the peanut applicator of FIG. 1. Additionally, drive means and connections for vacuuming an air suply are shown in FIG. 2. In this figure, a plurality of structural support members 907 are shown supporting the applicator assembly. The structural support members 907 are simply structural metal members which are welded, rivoted, or otherwise fastened to stationary portions of the peanut applicator, including a front wall plate 8 and at the rear to the end plate 7 and to the air supply end plate 6. Alternatively, the rear structural support members 907 may be connected to a rear wall plate 9 seen in FIG. 2. Nonetheless, any support means may be used in the present invention, for example the peanut applicator apparatus could be suspended by attachment of a cable to any of the stationary parts (discussed hereunder). Alternatively, trust-racing could be used as well, or any other known type of structural support which can be anchored to any non-moving structures. In FIG. 2, the structural support members 907 are fixedly supported by a plurality of structural support bases 908, which in the usual case could be supports fastened to a floor or maybe a part of the floor itself.

An electric motor 902 shown in FIG. 2 is elevated above the conveyor belt 201. The electric motor 902 has an electrical cord 903 for supplying electrical power to the electric motor 902. The electric motor 902 has a motor output shaft 904. The motor output shaft 904 is connected, as is conventionally known, to a transverse bevel gear 905 which rotates a shaft angled downwardly from top to bottom in FIG. 2. Thus, the shaft of the transverse bevel gear 905 passes beneath the peanut hopper of FIG. 2 to a location where it rotates a chain drive pulley 909.

The chain drive pulley 909 is connected by a chain passing beneath one of the structural support members 907. The chain drive 906 then connects about a Boston collar 120 which then rotates the peanut applicator moving parts.

Although an electric motor 902 is shown as being used in the present invention, any type of rotary drive may be used. For example a pnuematic motor may be used, or a steam-driven motor may be used, or any type of rotary drive contemplated as being within the scope of the present invention. Furthermore, instead of a transmission linking a rotary drive to the Boston collar 120, the Boston collar 120 may be rotated directly by any known rotary drive means.

A vacuum pump 921 seen in FIG. 2 drawing air from the interior of the cylindrical drum member 4 by means of a vacuum hose 922 which is connected to a hose connector 5 which communicates with the interior of the structural support members 907. A pair of air supply hoses 931 are shown in FIG. 2 supplying air to portions of the interior of the cylindrical drum member 4, as explained further hereunder. A clamp 901 is shown in FIG. 2 connecting the peanut hopper to the rear wall plate 9 of the peanut applicator. The clamp 901 has a handle member which can be adjusted to tighten or loosen the clamp 901. Nonetheless, any type of connection may be made between the peanut supply hopper and the peanut appllicator of the present invention. For example, the peanut supply hopper may be welded to the rear wall plate 9 of the peanut applicator, or it may be rivoted, bolted, glued, ultrasonically welded, or attached thereto by any means whatsoever. The peanut supply hopper has a width at least equal to that of the groove formed in the cylindrical drum member 4 shown in FIG. 2. However, for convenience and ease of operation, the peanut hopper should be at least as wide as the cylindrical drum member 4 itself and preferrably wider than the entire peanut applicator assembly so that constant refilling can be avoided.

The height or depth of the peanut hopper is also generally arbitrary so long as a sufficient number of peanuts are supplied (as seen in the view of FIG. 1) to the cylindrical drum member 4 such that a sufficient number of individual peanuts 601 are available for deposition onto the extrudate rope 100. The peanut hopper is composed of a hopper back wall 710, to hopper side walls 700, and a threaded bores 620. However, the enclosure for the peanut hopper may have any arbitrary shape, such as cylindrical, spherical, triangular, or the like, so long as the enclosure, as seen in FIG. 1 having a slanted hopper rear wall 711, is sufficiently shaped to retain peanuts against the cylindrical drum member 4 without spalling or spilling of peanuts away from the peanut hopper.

Figure 4:
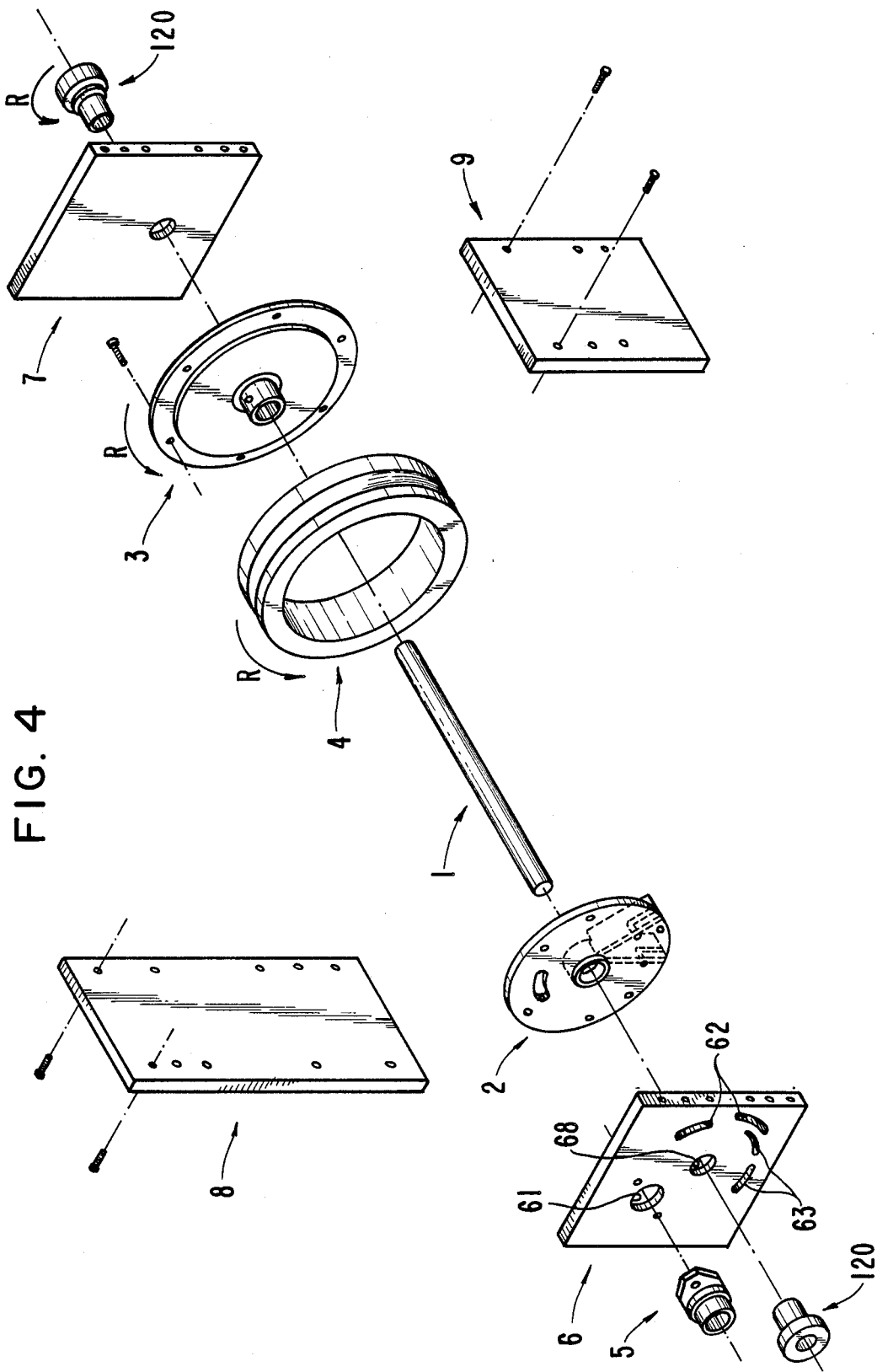
FIG. 4 is an exploded view of the peanut applicator, with the parts shown in perspective.

FIG. 4 is an exploded view of the parts forming the peanut applicator assembly, but not including the parts for the peanut hopper portion of the peanut applicator. A front wall plate 8 is connectable to an end plate 7 and to an air supply end plate 6 to form a portion of a rigid enclosure of the rotating parts, which are the rotating drum end member 3, the cylindrical drum member 4, the shaft nut applicator rod 1, and both the near Boston collar 120 (as seen in FIG. 4) and the far Boston collar 120. The enclosure is completed by assembly of the rear wall plate 9 to the edges of the air supply end plate 6 and the end plate 7.

The stationary components include the enclosure members described above, as well as the hose connector 5, the air supply end plate 6, the stationary drum end members 2. Bolts connect stationary portions together, as suggested in the figures, as well as connecting the rotating drum end member 3 to the cylindrical drum member 4. The parts are further described in the remaining figures showing the individual components of the peanut applicator assembly. In FIG. 4, small details have been omitted in order to give a clear teaching of exactly how the components are assembled together in a perspective manner.

FIG. 5 is a side elevational view showing the peanut applicator assembly from the opposite side of that shown in FIG. 1, and generally with the near side same as that shown in FIG. 4. Here, the peanut hopper is seen as having a hopper side wall 712, which is beneath the hopper side walls 700. Also, the connection of the hose connector 5 is more clearly shown in relationship with a curvilinear slot 24.

Also, the connection of the exterior facing plate surface 610 to the air supply end plate 6 is shown as being by a plurality of retaining bolts 720, only two of which are shown in FIG. 5, the remaining being indicated as being evenly spaced about a radius occupied by the two retaining bolts 720 shown. A first upstanding stationary wall 25 and a second upstanding stationary wall 26 is shown in dotted outline in FIG. 5, together with an air inlet passageway 290 shown in dotted outline in each one.

Also shown in FIG. 5 is an air hose inlet location 941 and an air hose inlet location 942. The slots exposing a portion of the stationary drum end members 2 are seen in FIG. 5. Also, the rear wall plate body 190 of the rear wall plate 9 is shown in dotted outline in FIG. 5.

Figure 6:
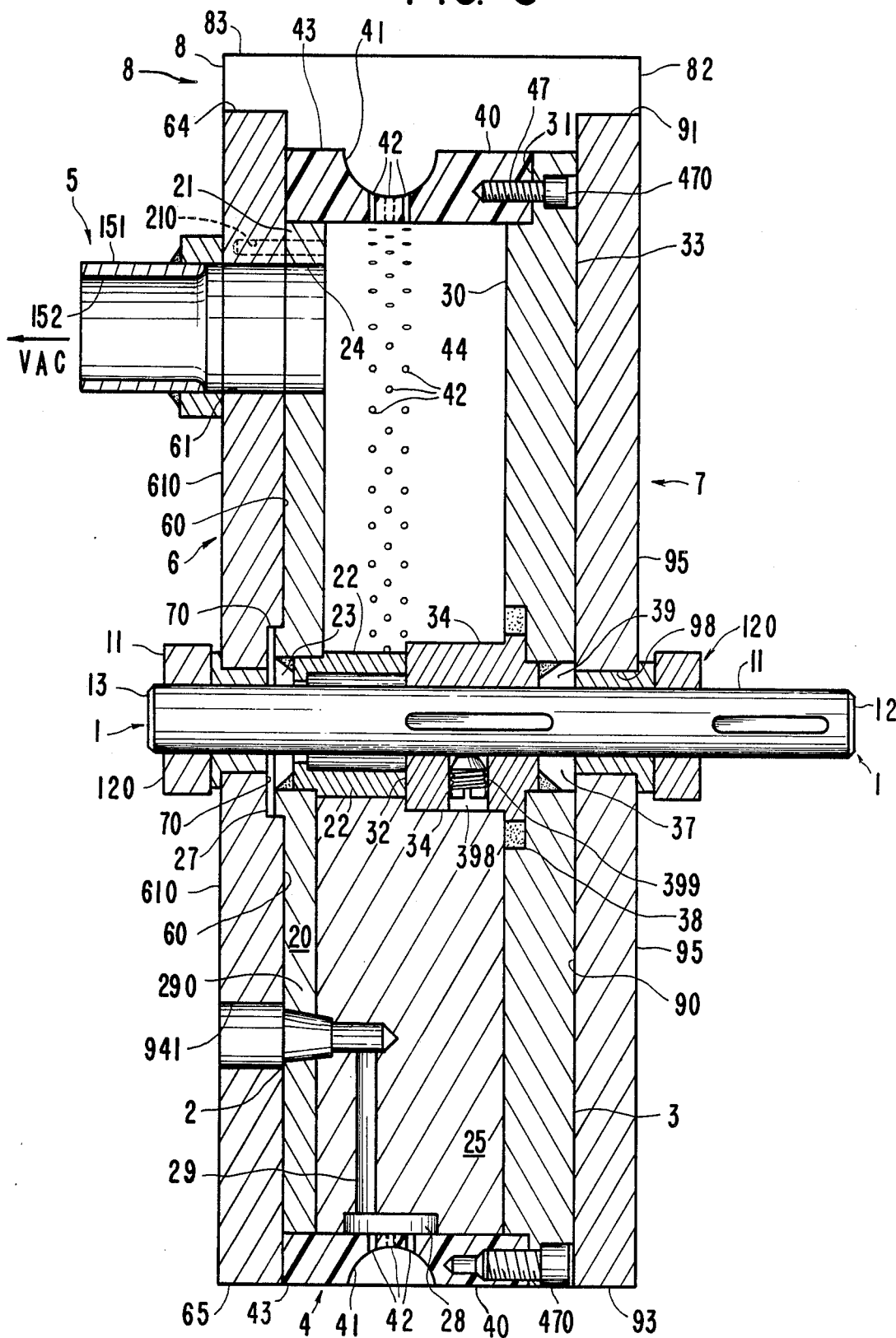
FIG. 6 is a side, sectional view of the peanut applicator shown in FIG. 5, the view being taken along line 6—6 of FIG. 5.

FIG. 6 is a side sectional view taken along line 6—6 of FIG. 5. In this view, the various components are shown in section as they would be assembled together during operation. Only the cylindrical shaft body 11 of the shaft nut applicator rod 1 is not shown in section, but rather in cut-away for clarity. The air hose inlet location 941 is seen formed through the air supply end plate 6 in FIG. 6. The air hose inlet location 941 communicates with an air inlet passageway 290 which in turn communicates with an air supply bore 29 which in turn communicates with an air supply slot 28; all of which are formed in the stationary drum end members 2. As the cylindrical drum member 4 rotates, each of the air passages 42 pass adjacent to the air supply slot 28. Thus, pressurized air introduced into the air hose inlet location 941 passes through the stationary drum end members 2 and into and through the air passages 42. This air dislodges any peanuts which had been retained by a vacuum applied to a side of the air passages 42. The second upstanding stationary wall 26 also has a similar air passageway there through, and is separated from the first upstanding stationary wall 25 shown in FIG. 6 by an arch of approximately 30 degrees. Thus, peanuts are held upon the cylindrical drum member 4 by the vacuum until such point as the peanuts directly overlie the extrudate rope 100, at which point pressurized air is applied to allow the peanuts 601 to adhere to the caramel coating 105. Further, the second air passageway formed in the second upstanding stationary wall 26 dislodges peanuts at a location just before the bottom most wall of the peanut hopper is reached. At this location, the cylindrical drum member 4 again experiences at interior vacuum drawing and attaching peanuts to the air passages 42 so as to draw them from the peanut hopper.

A hub attaching member perimeter 34 is attached to the cylindrical shaft body 11 by means of a setscrew 399. The Boston collar 120 shown at either end of the shaft nut applicator rod 1 can also be attached by means of setscrews (not shown in FIG. 6). A bolt 470 is shown at the top and the bottom extent of the rotating drum end member 3 to affix it to the cylindrical drum member 4. Both of these members rotate together.

The interior of the cylindrical drum member 4 is shown as having an interior cylindrical surface 44, which is seen in FIG. 6. The air passages 42 are also visible in the interior cylindrical surface 44. A portion of a curvilinear slot 24 is aligned with a vacuum outlet bore 61 formed in the air supply end plate 6. The hose connector 5 is aligned with the vacuum outlet bore 61 so as to communicate with the interior of cylindrical drum member 4. As air is drawn out by means of the vacuum hose 922, to remove air by way of the hose connector 5, suction is applied from the interior of the cylindrical drum member 4 to each of the air passages 42. Thus, as the cylindrical drum member 4 rotates through the interior portion of the peanut hopper, individual peanuts 601 are picked up by each of the individual air passages 42. This causes a precisely predetermined number of peanuts to be applied to the extrudate rope 100 as the extrudate rope 100 passes beneath the cylindrical drum member 4.

The top of the front wall plate 8 is visible in FIG. 6 and is seen in elevational view. The rear wall plate 9 is not visible in FIG. 6. The other parts shown in FIG. 6 are discussed in greater detail hereunder, and are shown in the other figures.

In FIG. 6, it is especially noted that the first upstanding stationary wall 25 remains motionless together with the stationary drum end members 2 and the air supply end plate 6. It is the cylindrical drum member 4 and the rotating drum end member 3 which rotate relative to the stationary drum end members 2.

FIG. 7 is a front elevational veiw of the air supply end plate 6. In this figure, the attachment slots 62 are shown in their true shape; only two of the attachment slots 62 are shown, with six of the attachment slots 62 actually being provided spaced equangularly and also equadistantly from the center of the bore 68. The bore 68 is bored through the plate completely so as to be adapted to receive the shaft nut applicator rod 1. Surrounding the bore 68 is a rim 69. Between the rim 69 and the bore 68 is a shallow counterbore area which in FIG. 7 appears as an annular ring about the bore 68.

The interior plate surface 60 is seen in FIG. 7, and has a pair of air inlet connection slots 63 shown in their true form in this figure. The air inlet connection slots 63 extend completely through the plate and are used to provide space for an air supply to pass through the air supply end plate 6. The slots are elongated so as to make close machining tolerances of the air inlet connection slots 63 unnecessary, and also to permit an adjustable relative inclination of the stationary drum end members 2 which is affixed to the air supply end plate 6 during operation. To this end, the attachment slots 62 are also formed as slots, since the stationary drum end members 2 is fastened to the air supply end plate 6 by means of 6 bolts, the heads of which lie above the air supply end plate 6 in FIG. 7 and which are attached by insertion into threaded bores formed in the stationary drum end members 2. A vacuum outlet bore 61 is bored through the air supply end plate 6 to permit passage of air from the interior of the cylindrical drum member 4 into the vacuum outlet line. A pair of small threaded bores are disposed on opposite sides of the vacuum outlet bore 61, for permitting screw or bolt attachment of the hose connector 5 to the air supply end plate 6.

The air supply end plate 6 has a top plate edge 64, a bottom plate edge 65, a first plate edge 66, and a second plate edge 67. The space between the bore 68 and the rim 69 is called an annular ledge 70.

FIG. 8 is a side elevational view of the air supply end plate 6 of FIG. 7. Here, a plurality of threaded bores 620 are shown for receiving threaded fastening members such as bolts or screws. Also, a plurality of dowel holes 630 are shown in FIG. 8 for aligning the plate before insertion of threaded fasteners into the threaded bores 620.

Figure 9:
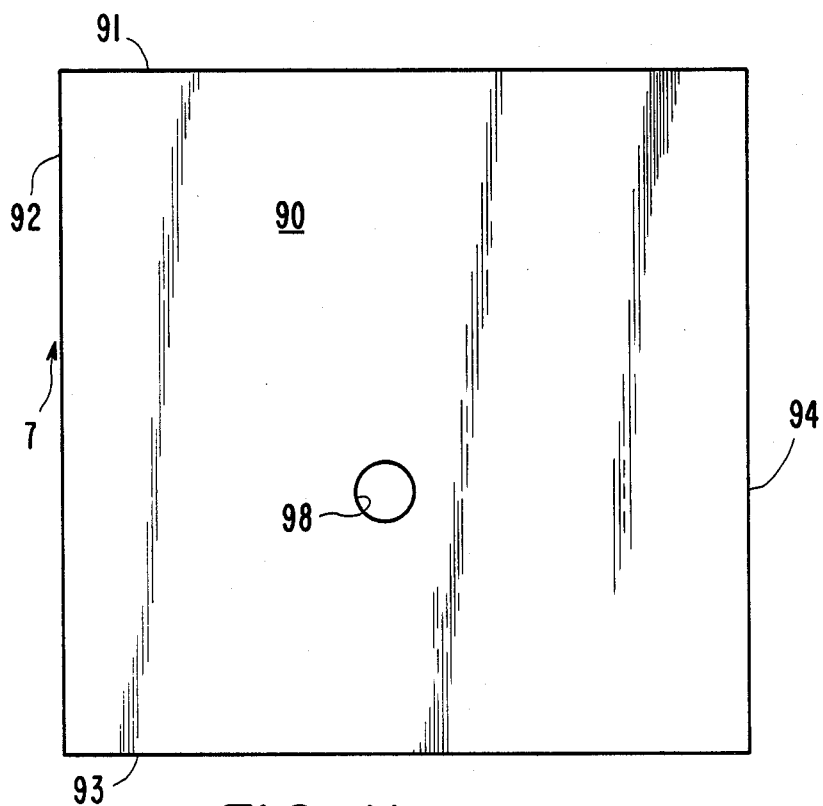
FIG. 9 is a front elevational view of another end plate according to the present invention.
Figure 10:
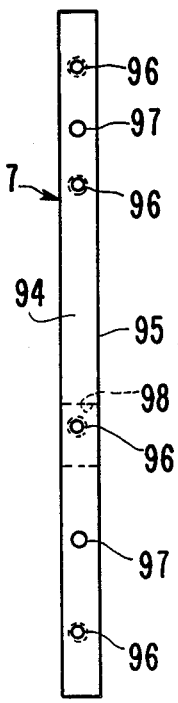
FIG. 10 is a side elevational view of the end plate of FIG. 9.

FIG. 9 is a top elevational view of a end plate 7. The end plate front 90 is visible in FIG. 9 in frontal view. The end plate 7 has a top plate edge 91, a first side plate edge 92, a second side plate edge 94, and a bottom plate edge 93. Also, the end plate 7 has a plurality of threaded bores 96 and a plurality of dowel holes 97, which are shown in FIG. 10. The threaded bores 96 and the dowel holes 97 are used for respectively fastening and aligning plate to the other members as shown in the preceding figures. In particular, the threaded bores 96 are adapted to receive a threaded member such as a screw or bolt for fastening purposes.

FIG. 10 is a side elevational view of the end plate 7 of FIG. 9. In this figure, the second side plate edge 94 is visible in frontal elevational view.

Figure 11:
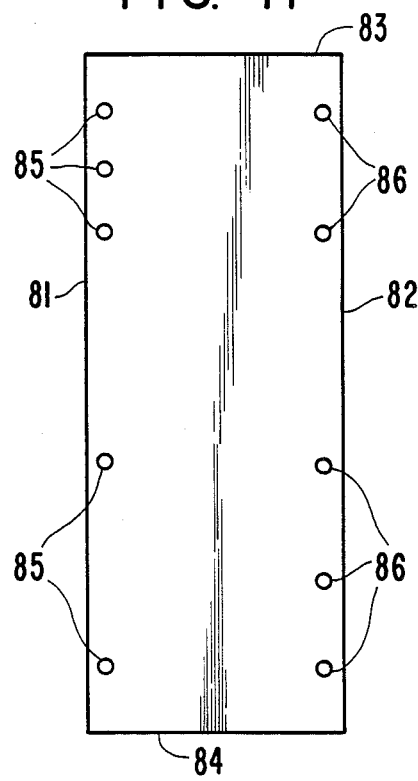
FIG. 11 is a front elevational view of a front wall plate according to the present invention.

FIG. 11 is a front elevational view of the front wall plate 8. In this figure, the wall front plate body 80 is visible in front elevational view. The front wall plate 8 has a top front wall plate edge 83, a bottom front wall plate edge 84, a left front wall plate edge 81, and a right front wall plate edge 82.

The front wall plate 8 has a plurality of bores 85 and bores 86. Each of the bores is formed completely through the front wall plate 8. The left front wall plate edge 81 and the right front wall plate edge 82 are smooth and need not have any holes therein.

Figure 12:
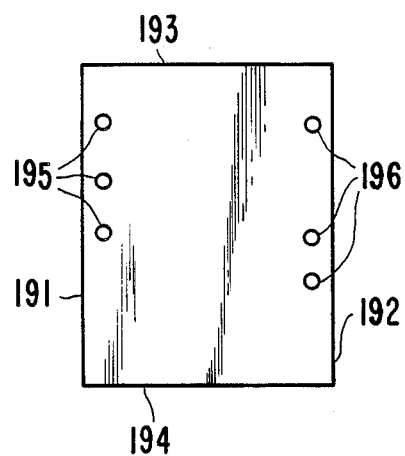
FIG. 12 is a front elevational view of a rear wall plate according to the present invention.

FIG. 12 is a front elevational view of a rear wall plate 9. The rear wall plate 9 has a rear wall plate body 190. The rear wall plate 9 also has a left rear wall plate edge 191, a right rear wall plate edge 192, a top rear wall plate edge 193, and a bottom rear plate edge 194. A plurality of bores 195 and of bores 196 are formed completely through the rear wall plate body 190. The bores are adapted to permit passage of a threaded member therethrough so that the rear wall plate 9 can be fastened, as by a screw to other members, as shown in FIG. 6. No other holes need be formed in the edges or in the front or rear surfaces of the rear wall plate body 190.

In the preferred embodiment, described above, threaded fasteners are used. However, any type of fastening means may be used, for example ultrasonic welding, glueing, use of adhesive, use of rivots, use of cable or string, or the like. Any type of fastening means for fastening parts together is comtemplated as being within the scope of the present invention.

Figure 13:
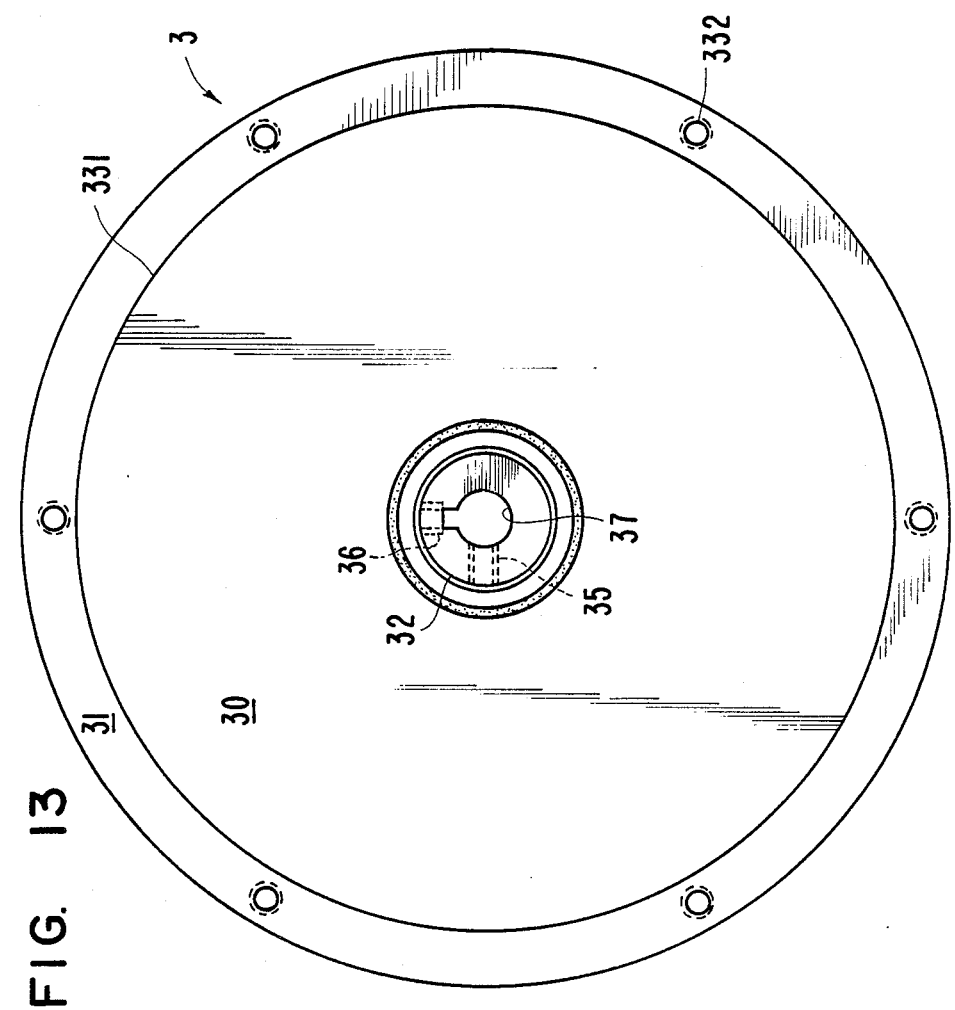
FIG. 13 is a front elevational view of a rotating drum end member.

FIG. 13 is a front elevational view of a rotating drum end member 3. The rotating drum end member 3 is adapted to be connected to, and rotate with, the cylindrical drum member 4. To this end a plurality of bores 332 are formed through the rotating drum end member 3, on a portion of flat annular ledge 31. A perimetral rim 331 is formed that is adapted to be snuggly received within the inner portion of the cylindrical drum member 4 to which the rotating drum end member 3 is to be attached.

The rotating drum end member 3 has a flat inner surface 30, and a hub attaching member flat annular face 32 is formed on a cylindrical member fixedly attached to the flat inner surface 30 and to the hub-receiving bore 39. The hub-receiving bore 39 is adapted to receive the hub attaching member. The hub attaching member has a hub attaching member flat annular face 32 and a hub attaching member perimeter 34 as can be seen in FIG. 13. A key-shaped bore 37 is formed in the hub attaching member. Also, the hub attaching member has in the preferred embodiment a first setscrew threaded bore 35 and a second setscrew threaded bore 36. The first setscrew threaded bore 35 and the second setscrew threaded bore 36 are adapted to receive setscrews therein, for the purpose of fixedly attaching th entire rotating drum end member 3 to the shaft nut applicator rod 1.

Figure 14:
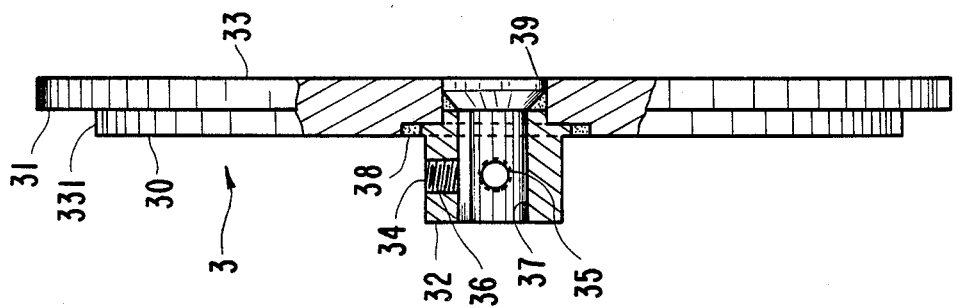
FIG. 14 is a side sectional view of the end member of FIG. 13.

FIG. 14 is a side sectional view of the rotating drum end member 3 of FIG. 13. Here, all of the above-mentioned features are prominent as well as is the flat end member outer wall 33 which is the opposite surface to that shown in FIG. 13. Additionally, a weld bead 38 is shown in both FIGS. 13 and 14, and it is the weld bead 38 which fixedly attaches the hub attaching member to the main body of the rotating drum end member 3.

Figure 15:
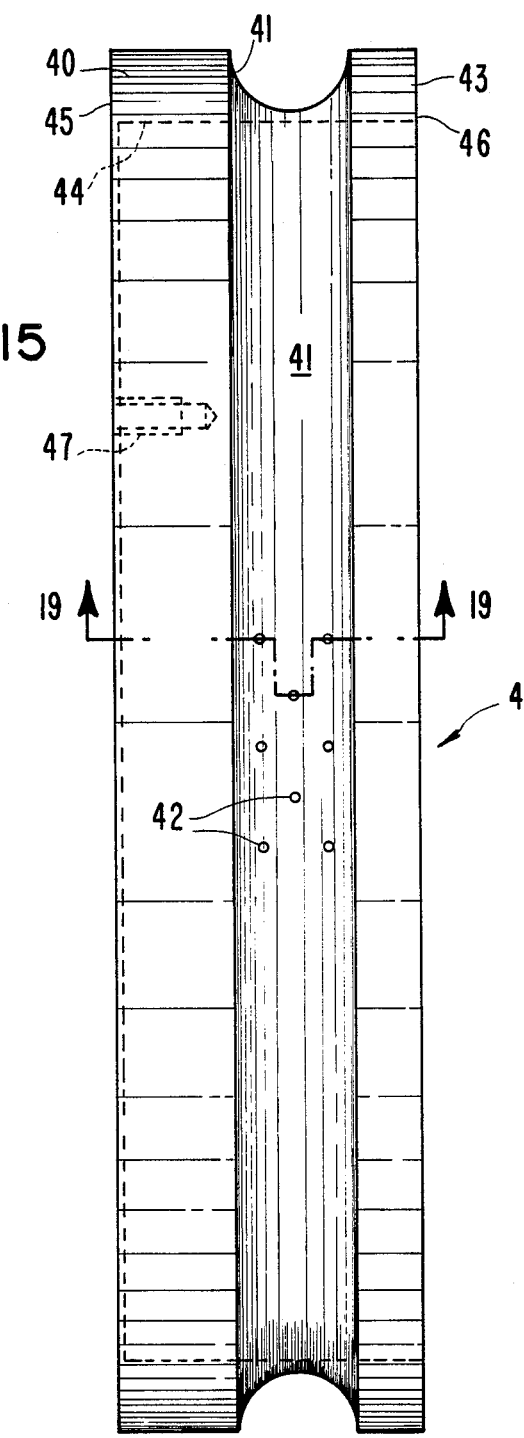
FIG. 15 is a side elevational view of a cylindrical drum member according to the present invention.

FIG. 15 is a side elevational view of the cylindrical drum member 4. Here, the drum groove 41 can be clearly seen and has a plurality of air passages 42 formed therethrough. The drum groove 41 is adapted to closely abutt the surface of the extrudate rope 100 during operation of the cylindrical drum member 4, so as to dispense peanuts onto the caramel coating 105.

As can be seen in FIG. 15, a true length of one of a plurality of threaded bores 47 is shown. The threaded bores 47 are spaced uniformly about the perimeter of the cylindrical drum member 4. The cylindrical drum member 4 has a first rim portion 40 and a second rim portion 43; the first rim portion 40 is somewhat wider than the second rim portion 43.

The cylindrical drum member 4 has a first drum side edge 45 and a second drum side edge 46.

Figure 16:
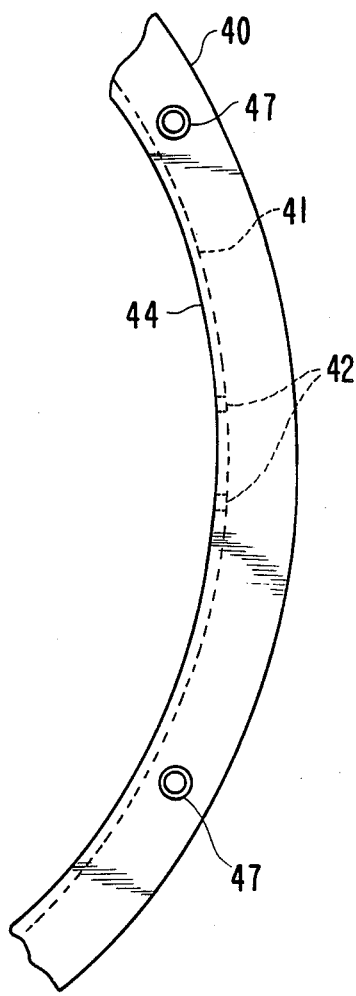
FIG. 16 is a front elevational view of the drum member in FIG. 15.

FIG. 16 is a front elevational view of the cylindrical drum member 4, and shows the arrangement of two of the plurality of threaded bores 47. In FIG. 16, an interior cylindrical surface 44 is visible together with a dotted outline of the lower most extent of the drum groove 41. Also, two of the air passages 42 are shown in dotted outline in FIG. 16.

FIG. 17 is a side elevational view of the shaft nut applicator rod 1. Here, the true length of a first slot 16 and a second slot 17 are shown. These slots are useful for receiving the tip or point of a setscrew which is used to fasten other members to the shaft nut applicator rod 1. The shaft nut applicator rod 1 has a first cylindrical shaft end 12 and a second cylindrical shaft end 13 the shaft nut applicator rod 1 is adapted to pass through and support the elements as seen in FIG. 6.

FIG. 18 is a front elevational view of the shaft nut applicator rod 1. Here, it is seen that the shaft nut applicator rod 1 has a circular perimeter, and the depth of the second slot edge 15 is seen in dotted outline. The first slot 16 has a upper first slot edge 14 and a lower first slot edge 18. The second slot 17 has an upper second slot edge 15 and a lower second slot edge 15.

Although the shaft nut applicator rod 1 is shown as being a cylindrical solid body, it may be hollowed out, or it may peliginal, or even have an irregular shape, so long as the corresponding parts which must be fitted to it have corresponding shapes where entry of the shaft nut applicator rod 1 is permitted and where the other body is to rotate with the shaft nut applicator rod 1. In those articles through which the shaft nut applicator rod 1 passes and rotates relative thereto, the opening in the body through which the shaft nut applicator rod 1 passes need only be slightly larger than largest diameter of the shaft nut applicator rod 1. Additionally, the shaft nut applicator rod 1 can be hollowed out, or formed from a honeycomb shape, so long as it is sufficiently strong to support and rotate the components of the peanut applicator assembly.

It is contemplated that the foregoing parts of the peanut applicator assembly may be manufactured preferrably of stainless steel or aluminum. Nonetheless, it is contemplated as being within the scope of the present invention to form the components of the peanut applicator assembly from any known material such as plastic, brass, wood, stone or the like. Furthermore, although the shaft nut applicator rod 1 has a first slot 16 and second slot 17, any known means of attaching the parts which are to rotate together with the shaft nut applicator rod 1 may be used, for example by welding, ultrasonic welding, glueing, rivoting, use of adhesive, use of a shrink-fit between the components, or the like.

FIG. 19 is a side elevational view of the portion of the cylindrical drum member 4 indicated along 19—19 of FIG. 12. Here, the depth of the air passages, formed by internal bores 144 and air passages 42, are shown.

As can be seen, the two internal bores 144 have relatively deeper penetrations into the thickness of the cylindrical drum member 4 due to the greater relative depth of the respective air passages 42 associated therewith. A plurality of central bores 145 are present as well, in this instance a single one of the central bores 145 are shown. The depth of the one of the central bores 145 shown is much shorter than that of either of the internal bores 144. Each of the central bores 145 also is associated therewith one of the air passages 42.

FIG. 20 is a perspective view of the stationary drum end members 2 taken from the rear. In this view, particularly clearly shown are the first upstanding stationary wall 25, the second upstanding stationary wall 26, and the stationary cylindrical hub portion 22. The stationary cylindrical hub portion 22 has a stationary hub bore 23.

A curvilinear slot 24 is shown formed through the body of the stationary drum end members 2. A disc 20 supports the first upstanding stationary wall 25, the second upstanding stationary wall 26, and the stationary cylindrical hub portion 22; these parts may be attached to the disc 20 by any known method, such as welding, ultrasonic bonding, by the use of threaded fastening members, or the like. A plurality of stationary end member mounting holes 21 are formed through the disc 20, and are spaced equiangularly and equidistantly from the center of the stationary cylindrical hub portion 22. The stationary end member mounting holes 21 are shown in FIG. 20 as completely extending through the disc 20; each of the holes 21 is threaded and is adapted to receive a threaded faastening member. Although the holes 21 are shown in FIG. 20 extending completely through the disc 20, this need not be so but rather the holes need extend only a portion of the way through the disc from the opposite side of the disc 20 from that shown. In such case, the holes would be visible only in dotted outline in FIG. 20.

FIG. 21 is a rear elevational view, which is taken from the front of FIG. 20 (which is itself a rear view). Here, the true length of each of the first upstanding stationary wall 25 and the second upstanding stationary wall 26 are shown. Also, the curvilinear slot 24 is shown in true dimensions also in FIG. 21.

A transverse air supply bore 292 is shown in dotted outline in FIG. 21, and communicates with a air supply bore 29 (also shown in dotted outline).

In FIG. 21 is shown in dotted outline a transverse air supply bore 292 which communicates with an air supply bore 29. The air supply bore 29 in turn communicates with an air supply slot 28. Thus, air under pressure is supplied to the transverse air supply bore 292 to thereby supply it to the air supply slot 28 by way of the air supply bore 29. This supply air path arrangement is formed in virtually identical fashion in both the first upstanding stationary wall 25 and in the second upstanding stationary wall 26. The transverse air supply bore 292 penetrates the surface opposing that shown in FIG. 21 (shown more clearly in FIG. 23).

In the preferred embodiment, the first upstanding stationary wall 25 and the second upstanding stationary wall 26 are welded to the annular rim 27 as indicated in FIG. 21.

FIG. 22 is a side sectional view taken along the line 22—22 of FIG. 21. Here, the stationary end member mounting holes 21 are shown clearly as passing entirely through the thickness of the stationary drum end members 2. Also, a for shortened elevational view of the second upstanding stationary wall 26 is visible in FIG. 22.

The end portion of the the first upstanding stationary wall 25 is also visible in elevational view in FIG. 22.

The air supply slot 28 is seen in FIG. 22 in dotted outline. The stationary cylindrical hub portion 22 is in cross section, and the weld attachment points are shown in the figure. A raised annular rim 27 is visible on the right hand portion of the stationary drum end members 2 as seen in the figure. This portion is adapted to engage with the annular ledge 70 of the air supply end plate 6. This serves to locate the plates together such that they are entirely concentric.

FIG. 23 is a sectional view taken along the line 23—23 of FIG. 21. Here, a section is taken through the middle of the first upstanding stationary wall 25, and shows clearly the outline of the air passageway. The transverse air supply bore 292 intersects the air supply bore 29, which in turn opens out into the air supply slot 28. Thus, air entering the transverse air supply bore 292 is communicated to the air supply slot 28. This air then would be in direct communication with the rotating body of the cylindrical drum member 4. The air passages 42 would receive air from the air supply slot 28, due to the close positioning of the air supply slot 28 to the air passages 42.

Figure 24:
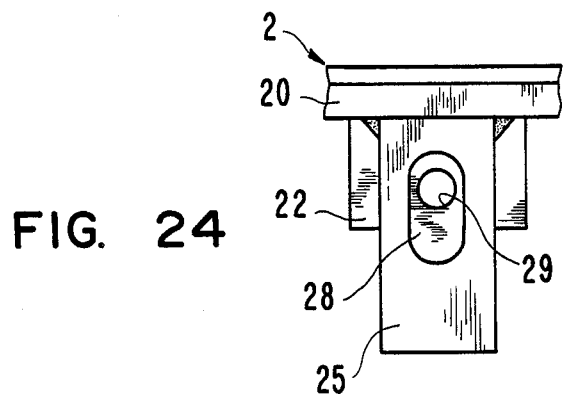
FIG. 24 is a side elevational view of the end member of FIG. 23.

FIG. 24 is an end elevational view of the first upstanding stationary wall 25. Here, the oblong oval outline of the air supply slot 28 is seen clearly. It is seen that the air supply bore 29 is circular. The stationary cylindrical hub portion 22 is visible in FIG. 24 and is behind the first upstanding stationary wall 25 in the figure, the sides of the stationary cylindrical hub portion 22 pertruding beyond either side of the first upstanding stationary wall 25.

The curvilinear slot 24 is visible in FIG. 23.

Figure 25:
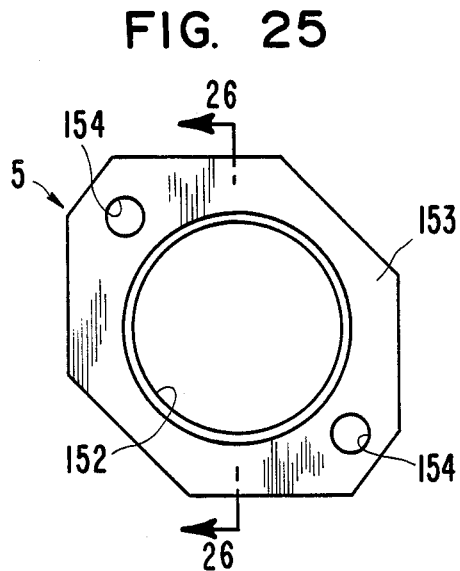
FIG. 25 is a front elevational view of a hose connector.

FIG. 25 is a front elevational view of the hose connector 5. The hose connector 5 has an interior hose connector bore 152, which is adapted to receive the shaft nut applicator rod 1. The hose connector bore 152 flares outwardly somewhat before intersecting the top surface 153 of the hose connector 5. A pair of bores 154 are seen in FIG. 25, and are adapted to permit passage of a threaded fastener therethrough so that the hose connector 5 can be fastened to the front surface of the air supply end plate 6. This allows attachment of a vacuum hose, for example as by a friction fit by manually forcing the vacuum hose over the outer surface of the cylindrical hose connector member 151. Any connecting means may be used, however, between the vacuum hose and the hose connector 5. For example, the hose may be glued to the hose connector 5, or the hose may be applied about the outer surface of the cylindrical hose connector member 151 and a metal band wrapped about the outer surface of the vacuum hose and then tightened as by a screw or other means, so as to frictionally retain the hose on the hose connector 5.

Figure 26:
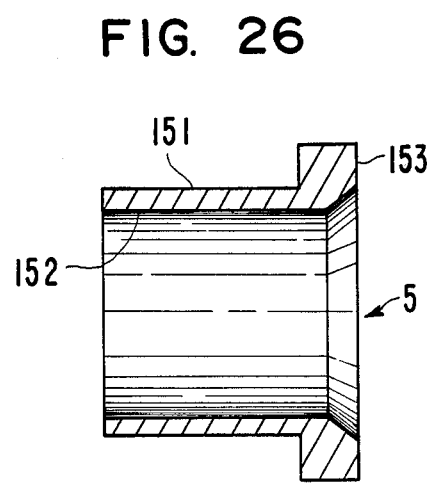
FIG. 26 is a side sectional view of the hose connector of FIG. 25.

FIG. 26 is a sectional view of the hose connector 5 taken along line 24—24 of FIG. 25. The parts are numbered as in FIG. 25. The hose connector 5, as with all of the other parts used, may be of any material that is sufficiently strong to enable a hose to be attached to it, for example aluminum, steel, stainless steel, bronze, wood, ceramic material, or plastics are all contemplated as being within the scope of the present invention.

Figure 27:
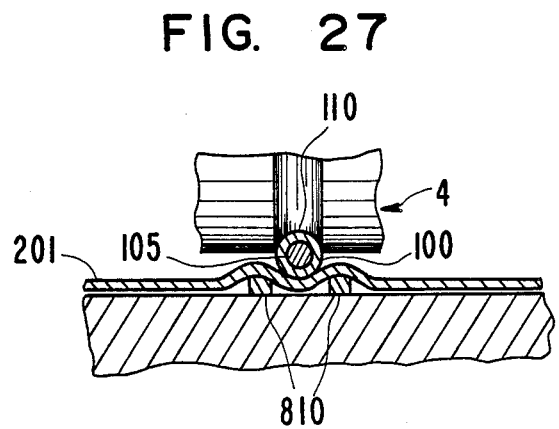
FIG. 27 is a side view, partially in section of the guide means according to the present invention.

FIG. 27 is a view partially in section taken along line 27—27 of FIG. 1. The extrudate rope 100 in FIG. 27 is shown as being of circular cross-section, which is merely one of a virtually infinite number of variations contemplated as being usable with the present invention; in the preferred embodiment, the generally rectangular cross-section of the extrudate rope 100 as shown in FIG. 3 would be used. Here, it is seen how the groove of the cylindrical drum member 4 meets the extrudate rope 100. Also, visible in cross section beneath the conveyor belt 201 is a pair of wooden blocks 810. These blocks underlie the conveyor belt 201 so as to create a region between them within which the extrudate rope 100 tends to remain centered. Beneath the conveyor belt 201 and the wooden blocks 810 is a support 108. The support 108 is conventionally made of steel or other metal, but may in fact be any support surface over which a conveyor belt may pass.

While vacuum hose hose and air pressure lines are shown, which are conventionally made of rubber or the like material, the vacuum hose may be formed of any type of conduit including stainless steel, plastic, ceramic material or the like. Furthermore, a director source of vacuum may be formed in any fashion from the location of the hose connector 5, as for example a strong fan of suitably small size may be used to draw air out of the cylindrical drum member 4 from the location at which the hose connector 5 is connected.

The improved peanut applicator and system of the present invention is capable of achieving the above-enumerated objects and while preferred embodiments of the present invention have been disclosed, it will be understood that it is not limited thereto but may be otherwise embodied within the scope of the following claims.

What is claimed is:

1. A method of making a continuous confectionery product comprising:
    (a) forming a continuous confectionery rope having an outer surface;
    (b) continuously applying discrete articles, such as peanuts, raisins or the like to the outer surface of the rope by continuously passing the rope through an article applicator, said applicator including a hollow rotatable cylinder having an inner and an outer surface, a groove disposed in the outer surface having a plurality of air passages extending from the inner surface to the outer surface; closely abutting said groove to said confectionery; applying a vacuum to the inner surface of the cylinder to retain the articles on the air passages within the groove as the cylinder passes by a hopper for supplying the articles to the cylinder; interrupting said delivers the discrete articles to the rope; and
    (c) applying a comestible coating to the outer surface of the rope.

2. The method of claim 1 further comprising the step of interrupting said vacuum on said articles as the groove substantially abuts the rope to drop the article onto the rope.

3. The method of claim 2 comprising the step of applying a positive pressure to the inner surface of the cylinder as the groove closely abuts the rope to assist said article onto the rope with sufficient force to adhere the article on the surface of the rope.

4. The method of claim 1 further comprising the step of warming said rope slightly to a soft texture to allow said articles to adhere to the rope.

5. The method of claim 1 where said articles are applied to side and central areas of the continuously moving rope.

6. The method of claim 1 wherein said rope includes a first and second portion and the first and second portions are co-extruded.

7. The method of claim 6 wherein the first portion is a fudge composition and the second portion is a caramel composition.

8. The method of claim 1 wherein the groove substantially conforms to the cross-section of the rope.

9. The method of claim 1 wherein the cylinder includes a plurality of parallel grooves and abuts a plurality of continuously moving ropes.

10. The method of claim 1 further comprising the step of placing said rope on a continuously moving conveyor means and conveying the rope through said applicator.

11. The method of claim 1 comprising rotating the cylinder at the same speed as the forward speed of the continuously moving rope.

12. The method of claim 1 where the plurality of air passages are uniformly spaced in the groove and said, articles are applied to the rope in a uniform pattern essentially corresponding to the spaced air passages.

13. The method of claim 1 further comprising severing the rope into uniform length pieces.

14. A method of applying discrete articles to the outer surface of a continuous plastic rope comprising:
    continuously passing a continuous plastic rope to an article applicator for applying discrete articles to a rope where said applicator includes a rotatable hollow cylinder having an inner and outer surface, a groove disposed in the outer surface having a plurality of spaced air passages extending from the inner surface to the outer surface, the groove being adapted to closely abut the rope, applying a vacuum to the inner surface of the cylinder to retain articles on the air passages within the groove as the cylinder passes by a hopper for supplying the articles to the cylinder, and interrupting the vacuum on the articles as the articles abut the rope whereby the articles are applied to the outer surface of the rope.

15. The method of claim 14 comprising the step of applying a positive pressure to the inner surface of the cylinder to interrupt the vacuum to assist said articles onto the surface of the rope.

16. The method of claim 14 wherein said plastic rope is a confectionery rope.

17. The method of claim 16 comprising warming said rope to a soft texture to allow said articles to adhere to the rope.

18. The method of claim 14 where said articles are applied to side and central areas of the rope.

19. The method of claim 14 where said groove substantially conforms to the cross-section of the rope.

20. The method of claim 14 where said cylinder includes a plurality of grooves and abuts a plurality of ropes.

21. The method of claim 14 where said cylinder is rotated at a speed substantially equal to the forward speed of the rope.

22. The method of claim 14 where said air passages are disposed equidistant on sides and bottom portions of the groove and the discrete articles are applied to side and central surfaces of the rope in a uniform spaced pattern.

23. The method of claim 14 where the groove is annular.

24. A method of applying discrete articles to the outer surface of a continuous plastic rope comprising:
(a) delivering a continuous plastic rope to an article applicator for applying discrete articles to the surface of the continuous rope, the applicator including a rotatable hollow cylinder having an inner and an outer surface, a groove disposed in said outer surface of the cylinder and having a plurality of spaced air passages extending from the outer to the inner surface, means to apply a vacuum to the inner surface of the cylinder to retain articles on the air passages within the groove as the cylinder passes by a hopper for supplying the articles to the cylinder;
(b) rotating the cylinder and applying a vacuum to the inner side of the cylinder to retain the articles on the air passages;
(c) continuously passing said plastic rope through the applicator in a closely abutting relation with the groove of the rotatable cylinder;
(d) interrupting the vacuum to the inner surface of the cylinder to dislodge the articles as the articles are in the abutting relationship with the rope.

25. The method of claim 24 further comprising applying a positive pressure to the inner surface of the cylinder to interrupt the vacuum and assist the article onto the surface of the rope.

26. The method of claim 24 where said rope is a confectionery rope.

27. The method of claim 26 comprising warming the confectionery rope to a soft texture before applying the articles to allow the articles to adhere to the rope.

28. The method of claim 24 where air passages are disposed on the sides and bottoms of the groove and articles are applied to side and central portions of the rope.

29. The method of claim 24 where the air passages are uniformly spaced in the groove and articles are uniformly spaced on the rope.

30. The method of claim 24 where the groove conforms substantially to the cross-section of the rope.

31. The method of claim 24 where the cylinder rotates at the speed substantially equal to the forward speed of the rope.

* * * * *

UNITED STATES PATENT AND TRADEMARK OFFICE
CERTIFICATE OF CORRECTION

PATENT NO. : 4,851,248
DATED : July 25, 1989
INVENTOR(S) : SIMELUNAS ET AL

It is certified that error appears in the above-identified patent and that said Letters Patent is hereby corrected as shown below:

On the cover page, the section beneath "Related U.S. Application Data" should read as follows:

--Division of Ser. No. 632,823, July 20, 1984, Pat. No. 4,760,778.--

Signed and Sealed this

Twenty-ninth Day of May, 1990

Attest:

HARRY F. MANBECK, JR.

*Attesting Officer*　　　*Commissioner of Patents and Trademarks*